United States Patent Office 3,489,612
Patented Jan. 13, 1970

3,489,612
METHOD OF IMPREGNATING SINTERED MATRIXES FOR NEGATIVE ELECTRODES FOR ALKALINE STORAGE BATTERIES WITH ACTIVE MATERIAL
Sven Uno Falk, Oskarshamn, Sweden, assignor to Svenska Ackumlator Aktiebolaget Jungner, Oskarshamn, Sweden
No Drawing. Filed Apr. 20, 1967, Ser. No. 632,225
Claims priority, application Sweden, Apr. 27, 1966, 5,732/66
Int. Cl. H01m 43/04, 35/30
U.S. Cl. 136—24                                    9 Claims

ABSTRACT OF THE DISCLOSURE

Sintered matrixes for negative electrodes for alkaline storage batteries are impregnated with active material by immersion in an aqueous solution of cadmium nitrate and cadmium formate or acetate, whereupon they are heated to such a temperature that the water evaporates and the salts are decomposed.

This invention relates to a method of impregnating sintered matrixes for negative electrodes for alkaline storage batteries with active material.

The impregnation methods hitherto used for sintered electrodes are time-consuming and toilsome due to the large amount of operations required for each impregnation cycle and that a comparatively great number of such impregnation cycles is required for obtaining a sufficient quantity of active material in the electrodes.

The actually most used method for impregnating negative electrodes is the so called polarization process. This process implied that the sintered plates are first immersed in a solution of a suitable cadmium salt, preferably nitrate or chloride, under vacuum. The electrodes are thereafter lifted up and connected in special polarization vats where they are cathodically polarized in an alkaline solution. After this operation the plates are transferred to a rinsing vat where the rinsing operation is carried out for several hours. The plates are finally dried in a suitable heating cabinet. Also this operation normally takes many hours. The above described impregnation cycle must be repeated six or seven times in order to reach the required mass coefficient (about 0.5 ah./cm.$^3$). From the above it appears that the polarization method is particularly time-consuming and furthermore difficult to automate due to contact difficulties in the polarization step.

Other methods based upon thermal decomposition of suitable cadmium salts have been developed mostly to reduce time and costs. Although these methods are based upon a simple cycle, they have, however, serious drawbacks.

One of these processes uses a melt of cadmium nitrate in which the electrodes are immersed. The plates are thereafter transferred to an autoclave for the decomposition of the nitrate. This operation is, however, complicated by the fact that the sintered matrix is vigorously corroded during heating if a reducing atmosphere is not provided around the plate. According to this method the plates are therefore generally placed in a closed autoclave whereupon hydrogene is brought to flow through the autoclave during the whole heating process. This is, of course, a quite time-consuming process, which furthermore implies considerable danger of explosion.

Thermal decomposition of cadmium formate has also been tried and this method operates satisfactorily. This method implies a simple two-step process, i.e. the immersion of the sintered matrix in a formate solution and the thermal decomposition to cadmium oxide in a simple oven to which air is admitted. The formate method has, however, the drawback that the solubility of the cadmium formate is so limited that about 20 impregnation cycles are required in order to reach the above mentioned coefficient.

The present invention relates to an impregnation method, the characteristic of which appears from the appended claims. This method is based upon a thermal decomposition of a mixture of cadmium nitrate and an organic cadmium salt, preferably cadmium formate or cadmium acetate. A mixed solution of these salts can be chosen in such a way that a high cadmium concentration is obtained. After the electrodes have been immersed into this solution they are placed in a simple oven where the thermal decomposition of the salts occurs. Due to the fact that reducing gases are generated during the decomposition of the organic cadmium salt, the oxidation which would have occurred if only the cadmium nitrate would have decomposed under the same conditions is entirely prevented. This method has therefor the advantage that no closed retort-furnaces are required and that the difficult through-flow of hydrogene is eliminated. The impregnation solution absorbed by the plates produces itself the anti-oxidation atmosphere required.

With this method high coefficients (about 0.5 ah./cm.$^3$) can be reached after 5–7 impregnation cycles, each cycle having about the same length as a cycle according to the formate method where 20 cycles are required in order to reach the required capacity. The method according to the invention thus achieves a considerable saving of time and labour.

The various operations of the process are described more in detail hereinafter by way of example.

(1) The sintered plates are placed in a suitable basket so as to be separated from each other. The basket is immersed in the impregnation solution which is maintained at a temperature of about 70°–90° C. and at pH-value of 3.5–4.0. The immersion time in the impregnation solution can be about 5 min.

(2) After a drainage time of about 1 minute the basket is transferred to an oven at a temperature of 325°–340° C. After about 20 min. the cadmium salts have been converted into cadmium oxide.

(3) The operations 1 and 2 are repeated until the required material quantity has been obtained.

The dry substance of the impregnation solution may contain 10–70% by weight of cadmium formate respectively 5–50% of cadmium actate, the rest being cadmium nitrate. The best result is obtained if the dry substance of the solution consists of 30–50% of cadmium formate respectively 30–50% of cadmium acetate the rest being cadmium nitrate. When using these solutions the sintered matrix is not subjected to any corrosion whatsoever.

The decomposition of the salts can occur within quite a wide temperature range, e.g. 300°–500° C. The above mentioned range of 325°–340° C. has, however, proved to be specially favourable.

The various process operations are particularly simple and well suited for automation.

Electrodes produced according to the above described method have electric characteristics which very well stand comparison with the characteristics achieved with conventional methods.

What I claim is:

1. A method of impregnating sintered matrixes for negative electrodes for alkaline storage batteries with active material comprising subjecting a sintered matrix to at least one cycle wherein said matrix is immersed in an aqueous impregnation solution at a temperature of 70–90° C. removing said matrixes from the bath, and heating to a temperature wherein the water evaporates and the salts are decomposed, said aqueous impregnation solution containing cadmium nitrate and an organic cadmium salt.

2. The method according to claim 1, characterized in that the organic cadmium salt in the solution is selected from the group consisting of cadmium formate and cadmium acetate.

3. A method according to claim 2, characterized in that the dry substance of the solution contains 10–70% by weight of cadmium formate the rest being cadmium nitrate.

4. A method according to claim 1, characterized in that the dry substance of the solution contains 5–50% by weight of cadmium acetate the rest being cadmium nitrate.

5. A method according to claim 1 characterized in that the matrixes are heated to a temperature of from 300° to 500° C. for the decomposition of the salts.

6. A process according to claim 3, characterized in that the dry substance of the solution contains from 30 to 50% cadmium formate.

7. A method according to claim 4, characterized in that the dry substance of the solution contains from 30 to 50% cadmium acetate.

8. A method according to claim 5, characterized in that the matrixes are heated to a temperature of from 325° to 340° C.

9. A method according to claim 1, wherein the pH of said impregnation solution is from 3.5 to 4.0.

References Cited

UNITED STATES PATENTS

| | | | |
|---|---|---|---|
| 2,831,044 | 4/1958 | Bourgoult et al. | 136—29 |
| 2,880,257 | 3/1959 | Murphy et al. | 136—29 |
| 2,952,570 | 9/1960 | Heuninckx | 136—24 XR |
| 3,041,388 | 6/1962 | Fukuda et al. | 136—24 |
| 3,068,310 | 12/1962 | Casey et al. | 136—24 |
| 3,248,266 | 4/1966 | Rampel | 136—75 |
| 3,284,237 | 11/1966 | Lambert et al. | 136—67 XR |

WINSTON A. DOUGLAS, Primary Examiner

A. SKAPARS, Assistant Examiner

U.S. Cl. X.R.

136—76